United States Patent Office 3,393,020
Patented July 16, 1968

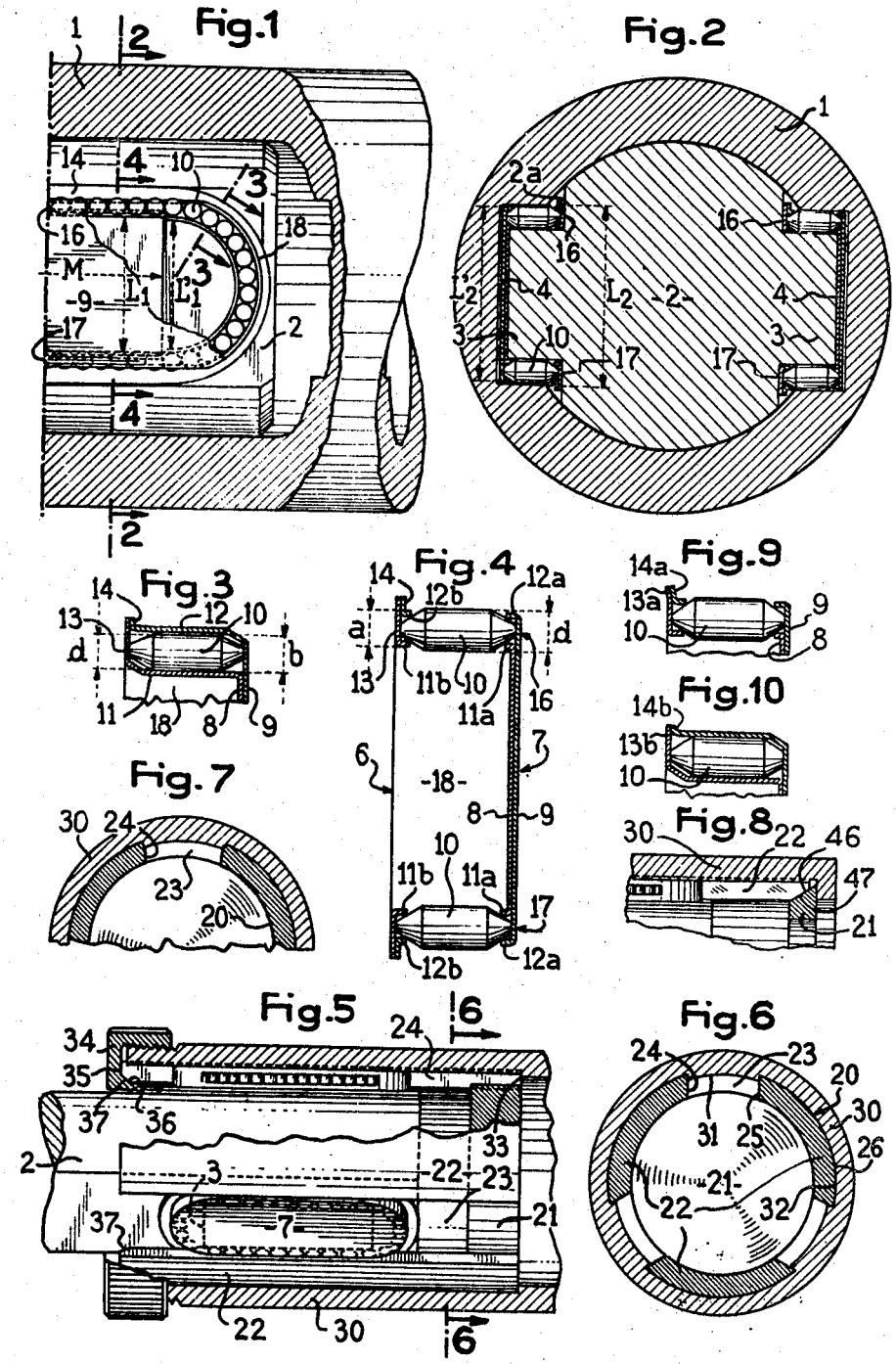

3,393,020
BEARING FOR RECTILINEAR MOVEMENT
Alfred Pitner, Paris, France, assignor of one-half to Nadella S.A., Rueil-Malmaison, France, a French corporation
Filed July 15, 1965, Ser. No. 472,196
Claims priority, application France, Oct. 23, 1964, 992,470
11 Claims. (Cl. 308—6)

ABSTRACT OF THE DISCLOSURE

A bearing for use between a mortise and tenon movable in the mortise, the bearing comprising two parallel rectilinear guideways for rolling elements, each guideway being defined by an inner lateral retaining wall and an outer lateral retaining wall which are apertured so as to permit an enlarged intermediate portion of the rolling elements to directly engage the mortise and tenon, the ends of the rolling elements being laterally retained by the two lateral retaining walls.

---

The present invention relates to needle or roller bearings employed as rolling means between two parts forming a mortise and tenon which undergo a relative movement of translation.

Bearings of this type are in the form of oblong cups or rings adapted to fit around a tenon and include two rectilinear guideways which can be interposed between two related faces of the tenon and mortise and along which the rolling elements are retained in a direction parallel to their axis and in a transverse direction perpendicular to said axis and to the plane of symmetry of the bearing, these two guideways being interconnected by passages of any shape, for example semi-cylindrical shape, which permits the rolling element to travel from one guideway to the other.

In needle bearings of known type, the means for transversely retaining the needles on the inside adjacent the tenon is an axial wall which also constitutes a race for the needles. This arrangement complicates manufacture since certain requirements are to be fulfilled as concerns for example precision and surface treatment.

Moreover, it restricts the possible applications owing to the nature of the surface of the wall interposed between the needles and the tenon, namely a sheet of metal having a low fatigue resistance and relatively large tolerances in respect to its thickness.

The object of the present invention is to remedy these drawbacks and to provide for this purpose a needle or roller bearing wherein alongside the guideways transverse retaining means for the rolling elements are provided in the region of the ends of the rolling elements so as to provide between said ends a free face for the direct rolling of the elements not only on the surface of the mortise but also on the related surface of the tenon.

Such a feature permits a high load capacity since this capacity is independent of the bearing. The bearing, or more precisely the mounting of the bearing which receives the needles or other rolling elements is not involved in the precision of the assembly, so that an excellent precision can be obtained since it is only dependent on that of the moving elements.

According to a preferred embodiment, the bearing is constructed of two cup-shaped members which are fitted one inside the other and interconnected, the flanks of said members being spaced apart along the guideways and apertured in such manner as to form two transverse retaining lips which extend axially on the small-diameter end regions of the rolling elements and having adjacent the elements a clearance relative to an adjacent plane tangent to the elements. The axial retainment of the rolling elements is normally achieved by the bottom of one of the cup-shaped members, for example the outer member, and by a flange formed on the flank of at least one of the cup-shaped members.

Such a construction, which is obtained by the assembly of two blanked and preformed members, results in a simple and cheap manufacture and great assembly facilities.

A needle bearing is already known in which the transverse retainment of the needles is provided exclusively at the ends of the latter which permits a direct rolling of the needles on the surfaces of the tenon and mortise. However, this bearing does not have needles in contact with each other since it is in fact a deformable and mobile cage which is provided with apertures for receiving the needles and operates in the manner of a transmission belt in extending around the circular shape of the ends of the tenons. Apart from the fact that the number of needles, and consequently the load capacity of such a bearing, are low, for a given tenon length, owing to the presence of the bars defining the needle apertures, this bearing has the serious drawback of requiring a very special shaping of the ends of the tenons and subjecting the cage to extreme fatigue in service owing to its ceaseless deformation and the necessity of employing for its manufacture a material which imperfectly satisfies the contradictory requirements of flexibility and a suitable guide effect.

According to another feature of the invention, for the purpose of avoiding the possibly rather delicate heat treatment of the female element in contact with which the rolling elements of the bearing roll there are fixed inside said female element or sleeve at least two segments of a cylinder which form therebetween flanks constituting a mortise, are suitably hardened, and interconnected or assembled by means of at least one complementary member.

Further features and advantages of the invention will be apparent from the ensuing description, with reference to the accompanying drawings to which the invention is in no way limited.

In the drawings:

FIG. 1 is a longitudinal sectional view of a shaft which is slidably mounted in a sleeve with interposition of two bearings according to the invention;

FIG. 2 is a cross-sectional view taken along line 2—2 of FIG. 1;

FIG. 3 is a partial sectional view taken along line 3—3 of FIG. 1;

FIG. 4 is a cross-sectional view taken along line 4—4 of FIG. 1;

FIGS. 5 and 6 are views corresponding to FIGS. 1 and 2 of an embodiment in which the shaft and the sleeve are assembled by means of three bearings;

FIG. 7 is a partial cross-sectional view of a variant of the embodiment shown in FIG. 6;

FIG. 8 is a partial longitudinal sectional view of a variant of the embodiment shown in FIG. 5, and FIGS. 9 and 10 are sectional views of variants of the embodiment shown in FIGS. 4 and 3 respectively.

FIGS. 1 and 2 show a sleeve 1 in which is slidably mounted a shaft 2 driven in rotation through the medium of two bearings according to the invention which are fitted by tenons 3 on the shaft 2 and engaged inside complementary mortises 4 on the sleeve 1. Each bearing comprises two cup-shaped sheet metal members 6 and 7 which are simple or composite (FIGS. 3 and 4) and are fitted one inside the other. Each comprises a bottom generally plane wall 8, 9, a lateral wall 11, 12 perpendicular to the bottom wall and a lower generally plane flange 13, 14.

The bottom walls 8 and 9 are applied against each other and the lateral walls 11, 12 each comprise two plane and parallel retaining portions which define two guideways 16, 17 for the needles 10 and are interconnected by two substantially semi-cylindrical end retaining portions 18 (FIG. 3).

The plane portions of the walls 11, 12 are so spaced apart that in the section 4—4 the distance $a$ between the outer faces of the walls is less than the diameter $d$ of the needles 10, the walls 11, 12 being apertured over a height which is such that merely the portions 11a, 11b and 12a, 12b remain for retaining the needles 10 which have tapered ends and straight or slightly curved generatrices. The rolling elements or needles co-operate with plane races at least one of which can be slightly convex over its width in accordance with a feature of the present invention.

The semi-cylindrical portions 18 are concentric and spaced such distance apart that the distance $b$ between the inner faces (FIG. 3) is slightly greater than the diameter $d$ of the rolling elements 10. The width $L'_1$ of the inner member 6 at the start of the radius is slightly less than the width $L'$ of the tenon 3 equipped with the bearing. It will be understood that the aperture in the plane portion of the outer member 7 is extended to such extent that the overall width $L'_2$, even in the semi-cylindrical portion, is less than the width $L_2$ of the mortise 4 in which the rolling elements are intended to roll. In the illustrated embodiment, the tenons are formed on the shaft and the mortises in the sleeve, as in conventional splined assemblies, but the invention is also intended to cover the case in which the mortises are formed on the shaft and the tenons inside the sleeve.

In any case, the flanks of the tenons and of the mortises are hardened by any known process and the tenon 3 has a given length M which is slightly less than the length of the apertures in the member 6 so as to permit a longitudinal positioning, the transverse positioning being achieved by the retaining flanges or lips 11a, 11b and by interconnection of the cup-shaped members 6 and 7, for example by means of spot welds on the flange 13 and 14 or the bottom walls 8 and 9 or by any other known means (for example clips or adhesion).

In order to avoid having to heat treat the female member which is the most delicate to carry out, an intermediate element 20 is employed as shown in FIGS. 5 and 6. This element 20 has a generally cylindrical shape and a bottom wall 21 interconnecting at least two portions of a cylinder, for example three portions such as 22, which form therebetween throughway openings, for example three recesses such as 23, each of which has two flanks 24, 25 which are suitably hardened, for example by the hardening of a suitable steel, or a localized case hardening. In order to center the shaft in the sleeve without machining concentric cylindrical surfaces, the invention provides at least three throughway openings formed by three portions of a cylinder.

Flanks 24, 25, which have a generally plane shape or slightly convex shape (FIG. 7) are provided so as not only to take into account possible bending of the constituent parts of the drive and in particular the tenons 3, but also to permit, by the joint utilization of convex faces, of three tenons and mortises and a clearance between the cylindrical surfaces located between the tenons and the mortises, the compensation of errors in division in the construction of the parts while insuring a sound centering.

The drive between the sleeve 30 and the intermediate element 20 is achieved by means of tenons 31 formed in this sleeve, the centering being obtained by the outside diameter 26 of the intermediate element bearing on the inside diameter 32 of the sleeve 30.

The axial positioning is achieved at one end by any means, such as a shoulder 33, as shown, a resilient ring, a blind hole, etc. the other end being clamped by means of a nut 34 bearing on a face 35. Advantageously, in order to impart stiffness to the assembly, the nut 34 can comprise a conical face 36 which co-operates with a conical face 37 formed on the intermediate element. This nut 34 can comprise sealing means (not shown) for retaining the lubricant within the system.

As a variant, the three segments of a cylinder 22 can be formed independent of the bottom wall 21 (FIG. 8). To maintain them in correct position there can be employed any means which are mechanical or not, such as welding, brazing, or an adhesive, but in particular it is possible in accordance with the present invention to urge these segments against their housing by a mechanical clamping acting on the ends. Thus, a conical surface, such as 47, is provided at the end of the members 22 opposed to the aforementioned conical surface 37 and a conical surface, such at 46—which could have a slightly convex generatrix to facilitate the supporting of the sections of the cone 47 of the various segments of a cylinder 22— is provided on the outside of the independent bottom wall 21 so as to center and also achieve a radial and axial positioning in combination with the nut 34, the surfaces 36 and 37 and the shoulder 33.

The invention also provides a system for compensating inequalities in length and diameter between the segments of a cylinder 22, which system could be resilient and comprise, for example the use of a ring 21 or a nut 34 which is deformable or an additional resilient device for insuring sufficient contact of these members with the ends of the various segments of a cylinder.

In the variant shown in FIG. 9, the portion 13a, 14a of the flanges 13, 14 of the cup-shaped members 6 and 7 which extend outwardly of the outer member 7 are slightly bent away from the bottom walls 8 and 9 so that they can fit the circular shape of the adjacent portion of the shaft 2.

In FIG. 10, the corresponding portions 13b, 14b have hardly been formed so as to avoid a complicated machining of the shaft at the ends of the tenons.

Although specific embodiments of the invention have been described, many modifications and changes may be made therein without departing from the scope of the invention as defined in the appended claims.

Having now described my invention what I claim as new and desire to secure by Letter Patent is:

1. Bearing for use as rolling means between two machine parts forming a mortise and tenon which undergo a relative rectilinear movement of translation, said bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways so as to constitute respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portion of the rolling elements and said outer retaining lips having outer faces remote from the intermediate portion of the rolling elements in each guideway, the distance between said inner and outer faces in each guideway being less than the diameter of said intermediate portion of the rolling elements, whereby said intermediate portions of the rolling elements are exposed and can roll directly on the mortise and tenon.

2. Bearing as claimed in claim 1, wherein the outer cup-shaped member has a transversely extending bottom wall and the inner cup-shaped member has an outer flange on the lateral wall thereof, the rolling elements being axially retained by said bottom wall and said flange.

3. In a structure comprising a sleeve, a shaft axially movable within the sleeve, a mortise integral with the sleeve and a tenon integral with the shaft, a bearing acting as rolling means interposed between the mortise and tenon, said bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways so as to constitute respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portion of the rolling elements and said outer retaining lips having outer faces remote from the intermediate portion of the rolling elements in each guideway, the distance between said inner and outer faces in each guideway being less than the diameter of said intermediate portion of the rolling elements, whereby said intermediate portions of the rolling elements are exposed and can roll directly on the mortise and tenon, the width of the inner cup-shaped member in the region where the portions of the lateral wall constituting the passageways adjoin the guideways being slightly less than the width of the tenon.

4. In a structure comprising a sleeve, a shaft axially movable within the sleeve, a mortise integral with the sleeve and a tenon integral with the shaft, a bearing acting as rolling means interposed between the mortise and tenon, said bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways constituting respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portion of the rolling elements and said outer retaining lips having outer faces remote from the intermediate portion of the rolling elements in each guideway, the distance between said inner and outer faces in each guideway being less than the diameter of said intermediate portion of the rolling elements, whereby said intermediate portions of the rolling elements are exposed and can roll directly on the mortise and tenon, the portions of the lateral wall of the inner cup-shaped member which define the guideways having a length exceeding the length of the tenon, whereby the bearing can be longitudinally positioned on the tenon.

5. In a structure comprising a sleeve, a shaft axially movable within the sleeve, a mortise integral with the sleeve and a tenon integral with the shaft, a bearing acting as rolling means interposed between the mortise and tenon, said bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways so as to constitute respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portion of the rolling elements and said outer retaining lips having outer faces remote from the intermediate portion of the rolling elements in each guideway, the distance between said inner and outer faces in each guideway being less than the diameter of said intermediate portion of the rolling elements, whereby said intermediate portions of the rolling elements are exposed and can roll directly on the mortise and tenon, the distance between said inner faces of the inner retaining lips of the two guideways being such that the lips of the inner cup-shaped member engage the tenon and locate the bearing transversely of the tenon.

6. Assembly comprising a sleeve, a shaft axially movable within the sleeve, mortises associated with the sleeve, tenons integral with the shaft, bearings for rectilinear movement acting as rolling means interconnecting the mortises and tenons, each bearing comprising an inner cup-shaped member disposed inside and secured to an outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways constituting respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portion of the rolling elements and said outer retaining lips having outer faces remote from the intermediate portion of the rolling elements in each guideway, the distance between said inner and outer faces in each guideway being less than the diameter of said intermediate portion of the rolling elements, whereby said intermediate portions of the rolling elements are exposed and can roll directly on the corresponding mortises and tenon, said mortise comprising an intermediate member having circumferentially spaced segments of a cylinder, an end wall interconnecting the segments of a cylinder, and means rigidly securing the intermediate member to the sleeve, the segments having axially extending flanks which define axially extending throughway radial openings, said flanks having a hardened surface along which the rolling elements roll.

7. Assembly as claimed in claim 6, wherein the end wall of the intermediate member is keyed to the wall of the sleeve and a nut is provided which bears against the end of the intermediate member opposed to said end wall and is screwthreadedly engaged with a corresponding screwthreaded portion of the sleeve, said nut having an inner portion engaging inner faces on said segments for radially maintaining said segments against the sleeve.

8. Assembly as claimed in claim 6, wherein the intermediate member comprises three segments of a cylinder and each of said flanks has a rolling surface which has a convex cross-sectional shape for the rolling elements, three tenons also being provided.

9. Assembly comprising a sleeve, a shaft axially movable within the sleeve, mortises associated with the sleeve, tenons integral with the shaft, bearings for rectilinear movement acting as rolling means interconnecting the mortises and tenons, each bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways, and two passageways interconnecting the guideways, rolling elements rollingly engaged between said inner and outer retaining walls, said passageways permitting the rolling elements to travel from one guideway to the other, apertures, in said inner retaining wall and in said outer retaining wall in the region of the guideways constituting respectively two inner retaining lips and two outer retaining lips in each guideway for transversely retaining the rolling elements, each rolling element having end portions and an intermediate portion of larger diameter than the end portions, said lips extending axially of the cup-shaped members alongside the rolling elements and engageable with solely said end portions of the rolling elements, said inner retaining lips having inner faces remote from the intermediate portions of the rolling elements and said outer retaining lips having outer faces remote from the intermediate portions of the rolling elements in each guideway, the distance between asid inner and outer faces in each guideway being less than the diameter of said intermediate portion of the rolling elements, whereby said intermediate portions of the rolling elements are exposed and can roll directly on the corresponding mortise and tenon, said mortises comprising separate circumferentially spaced segments of a cylinder and mechanical means associated with the sleeve and acting radially and axially on both ends of the segments and maintaining the segments in the sleeve, the segments having axially extending flanks which define axially extending throughway radial openings and said flanks having a hardened surface along which the rolling elements roll.

10. Assembly as claimed in claim 9, wherein said mechanical means are resiliently yieldable so as to compensate any inequalities in the dimensions of the ends of the segments.

11. Bearing for use as rolling means between two machine parts forming a mortise and tenon which undergo a relative rectilinear movement of translation, said bearing comprising an outer cup-shaped member and an inner cup-shaped member which is disposed inside and secured to the outer cup-shaped member, the outer cup-shaped member having a lateral wall constituting an outer retaining wall and the inner cup-shaped member having a lateral wall constituting an inner retaining wall, said inner and outer retaining walls being in laterally spaced relation and constituting two rectilinear guideways and two passageways interconnecting the guideways, rolling elements rollingly engaged between said inner and outer retaining walls, said passageways permitting the rolling elements to travel from one guideway to the other, apertures in said inner retaining wall and in said outer retaining wall in the region of the guideways so as to constitute respectively two inner retaining lips and two outer retaining lips in each guideway for transversely retaining the rolling elements, each rolling element having end portions and an intermediate portion of larger diameter than the end portions, said lip extending axially of the cup-shaped members alongside the rolling elements and engageable with solely said end portions of the rolling elements, whereby said intermediate portions of the rolling elements are exposed and can roll directly on the mortise and tenon.

References Cited

UNITED STATES PATENTS

| | | | |
|---|---|---|---|
| 1,047,773 | 12/1912 | Essberger | 308—6 |
| 2,787,144 | 4/1957 | Chauvel | 64—23 |
| 2,983,120 | 5/1961 | White | 64—23 |
| 2,995,908 | 8/1961 | Mazziotti | 308—6 |
| 3,065,034 | 11/1962 | White | 308—6 |
| 3,210,136 | 10/1965 | Anderson | 308—6 |

FOREIGN PATENTS

| | | |
|---|---|---|
| 57,104 | 12/1952 | France. |
| 975,115 | 3/1951 | France. |
| 1,339,932 | 12/1961 | France. |
| 1,346,506 | 12/1961 | France. |
| 1,193,830 | 11/1959 | France. |

MARTIN P. SCHWADRON, *Primary Examiner.*

L. L. JOHNSON, *Assistant Examiner.*